United States Patent
Hohl et al.

[11] Patent Number: 6,113,066
[45] Date of Patent: Sep. 5, 2000

[54] ELECTROMAGNETICALLY ACTUATED VALVE FOR HYDRAULIC BRAKE FOR MOTOR VEHICLES

[75] Inventors: Gunther Hohl, Stuttgart; Norbert Mittwollen, Markgroeningen, both of Germany; Dietmar Sommer, Charleston, S.C.

[73] Assignee: Robert Bosch GmbH, Stuttgart, Germany

[21] Appl. No.: 09/117,933

[22] PCT Filed: Dec. 12, 1996

[86] PCT No.: PCT/DE96/02399

§ 371 Date: Aug. 7, 1998

§ 102(e) Date: Aug. 7, 1998

[87] PCT Pub. No.: WO97/29000

PCT Pub. Date: Aug. 14, 1997

[30] Foreign Application Priority Data

Feb. 7, 1996 [DE] Germany .......................... 196 04 315

[51] Int. Cl.[7] ................................ F16K 31/06; B60T 8/36
[52] U.S. Cl. ................................ 251/129.02; 251/129.15; 303/119.2
[58] Field of Search ....................... 251/129.15, 129.02; 303/119.1, 119.2, 119.3

[56] References Cited

U.S. PATENT DOCUMENTS

| | | | |
|---|---|---|---|
| 5,255,855 | 10/1993 | Maier et al. | 251/129.15 X |
| 5,603,483 | 2/1997 | Reuter et al. | 251/129.02 |
| 5,605,386 | 2/1997 | Ziegler et al. | 303/119.2 |
| 5,803,556 | 9/1998 | Weis et al. | 303/119.2 |
| 5,836,334 | 11/1998 | Mittwollen et al. | 251/129.02 X |
| 5,879,060 | 3/1999 | Megerle et al. | 303/119.2 |
| 5,934,766 | 8/1999 | Feigel et al. | 303/119.2 |

FOREIGN PATENT DOCUMENTS 423756  2/1935  United Kingdom .............. 251/129.02

*Primary Examiner*—John Rivell
*Assistant Examiner*—Meredith H. Schoenfeld
*Attorney, Agent, or Firm*—Edwin E. Greigg; Ronald E. Greigg

[57] ABSTRACT

The valve has a seat valve with a hollow cone-shaped valve seat (28) and a closing member in the form of a segment of a ball. The valve seat is centrally fed by an influx bore that communicates with a pressure fluid inlet. A tappet that has the closing member is engaged by a magnet armature that acts on the seat valve in the closing direction and by a restoring spring that acts on it in the opening direction. The valve, which is embodied as an on-off valve, can be controlled in stable intermediary positions because of the following measures: the sealing diameter of the valve seat has at least 1.3 times the diameter of the influx bore; the cone angle of the valve seat is at most 110°; the magnetic force can be smoothly changed, wherein its course decreases monotonously with an increasing valve opening stroke; the force on the closing member, produced by the pressure fluid and the restoring spring, has a monotonously decreasing course with increasing valve opening stroke, whose inclination is quantitatively greater than that of the magnetic force progression.

3 Claims, 2 Drawing Sheets

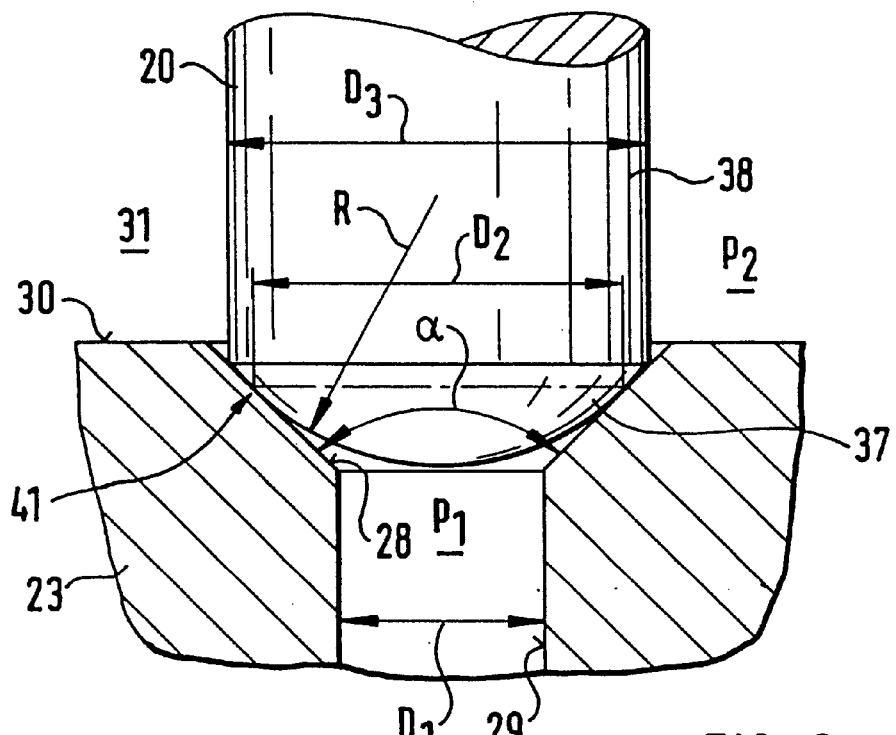
FIG. 2
FIG. 3
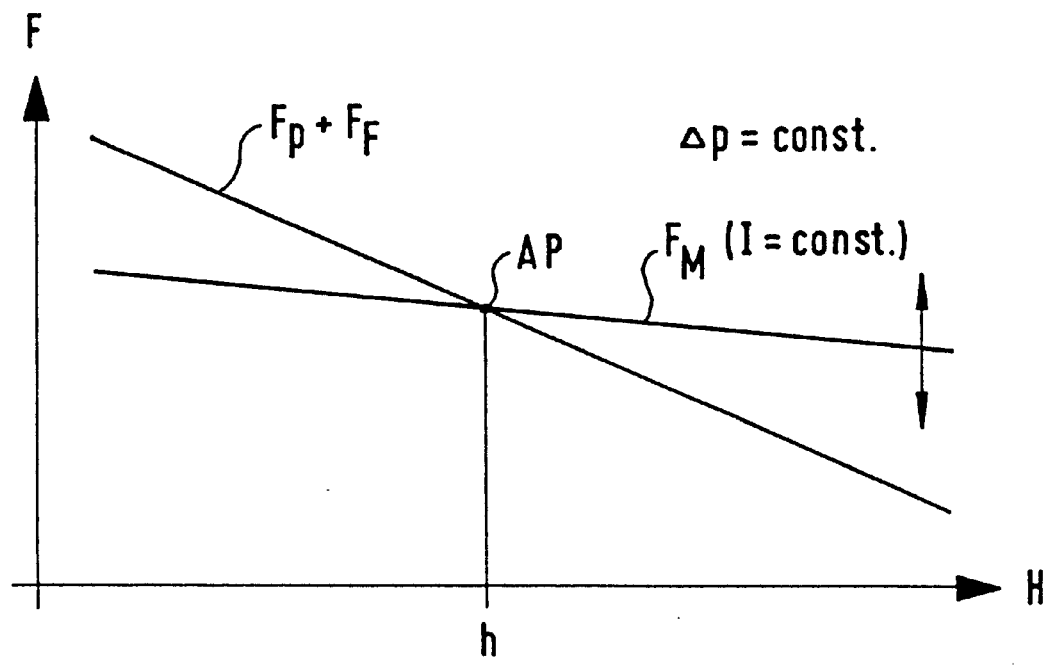

6,113,066

ELECTROMAGNETICALLY ACTUATED VALVE FOR HYDRAULIC BRAKE FOR MOTOR VEHICLES

PRIOR ART

The invention is based on an electromagnetically actuated valve for hydraulic brake systems of motor vehicles.

A valve of this kind has already been disclosed (DE 44 12 648 A1), whose seat valve assumes its open position through the action of a restoring spring and can be switched in a magnetically actuated manner into its position that shuts off the through flow of pressure fluid. In terms of its construction, the known valve is therefore an on-off valve in the form of a reasonably priced 2/2-way valve. Furthermore, constructive measures on the closing member and tappet achieve the fact that with sufficiently great pressure drops, due to hydraulic forces, the seat valve is automatically moved from the closed position to a partially closed position in which the volume flow is reduced. The known valve can therefore be advantageously used in slip-controlled hydraulic brake systems in order to produce a favorable behavior with regard to performance quality and noise emission when there is a pressure increase, e.g. of a brake slip control.

ADVANTAGES OF THE INVENTION

The valve according to the invention has the advantage over the prior art that similar to the function of a proportional valve, it can be transferred using small strokes into an arbitrarily large number of intermediary positions by controlling the magnetic force, but without being required to have the costly design of a proportional valve. This manner of function can be essentially attributed to the fact that hydraulic forces acting on the closing member can be changed as a function of the stroke because of the configuration of the valve seat and closing member. With the valve according to the invention, therefore, a largely continuous through flow control can be achieved. In many applications, it can be used in lieu of proportional valves. In slip-controlled brake systems, the use of the valve according to the invention achieves a higher performance quality and a lower noise emission than are produced using the known valve.

A definite relief of the pressure fluid flow is achieved with the valve set forth hereinafter.

Consequently, unstable flow forces are to a large extent prevented.

BRIEF DESCRIPTION OF THE DRAWINGS

An exemplary embodiment of the invention is represented in simplified form in the drawings and will be explained in more detail in the description that follows.

FIG. 2 shows the seat valve disposed in the closed position, in a scale that is enlarged in comparison to FIG. 1, and FIG. 3 is a diagram of the forces in the seat valve over the valve opening stroke.

DESCRIPTION OF THE EXEMPLARY EMBODIMENT

Figure 1:
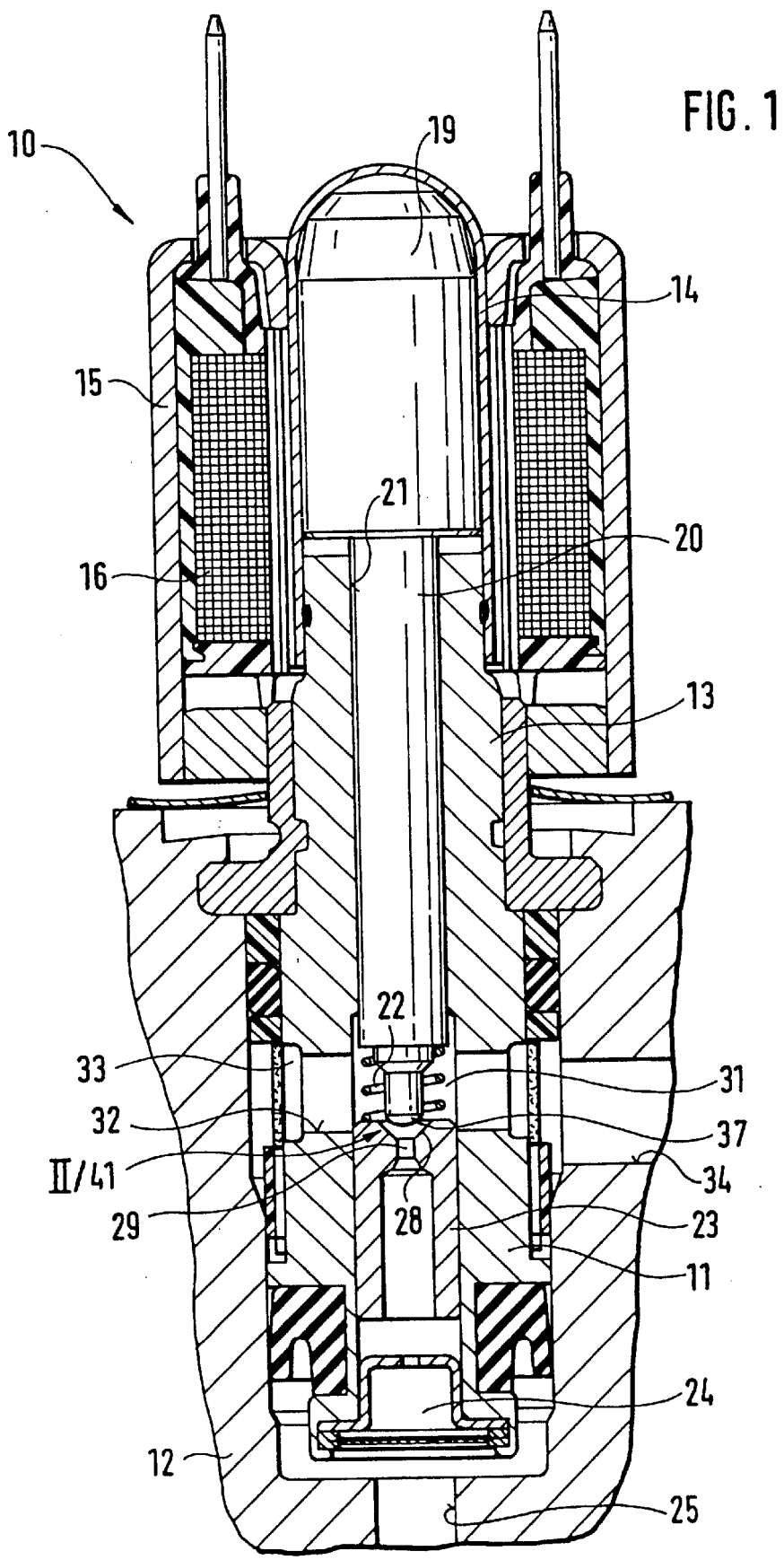
FIG. 1 is a longitudinal section through an electromagnetically actuated valve, with a seat valve, In the form of detail II from FIG. 1.

An electromagnetically actuated valve 10 represented in FIG. 1 of the drawings has a valve housing 11 with which it is contained in a valve block 12. Outside the valve block 12, the valve housing 11 is continued in a pole core 13. A sleeve-shaped valve dome 14 is fastened in a pressure-tight manner to the pole core 13. An annular magnet coil 16 that is enclosed by a magnetic flux-conducting housing 15 is slid onto this valve dome as well as a portion of the pole core 13.

A longitudinally movable magnet armature 19 is disposed in the valve dome 14. This armature engages a tappet 20, which is contained in a longitudinal bore 21 of the pole core 13 and the valve housing 11. A restoring spring 22 engages the longitudinally movable tappet 20 remote from the armature.

The restoring spring 22 is supported on a longitudinally bored valve body 23 that is press fitted into the valve housing 11. This valve body is connected to a pressure fluid inlet 24 of the valve 10, which communicates with a conduit bore 25 of the valve block 12.

On the end oriented toward the tappet, the valve body 23 has a valve seat 28 in the shape of a hollow cone, with a cone angle a of at most 110° (FIG. 2). The valve seat 28 is centrally fed by an influx bore 29 with the diameter $D_1$ and this bore communicates with the pressure fluid inlet 24. The valve seat 28 ends in a sharp-edged fashion on the radial outside at an end face 30, which defines the valve body 23 in relation to a valve chamber 31 and extends at right angles to an axis in which the valve body 23, the valve seat 28, the tappet 20, and the magnet armature 19 are disposed. The valve chamber 31 is connected to a lateral bore 32, which constitutes the pressure fluid outlet 33 of the valve 10 and communicates with a conduit bore 34 of the valve block 12. The longitudinal bore 21 and the valve dome 14 are connected to the valve chamber 31 in a pressure fluid-conducting manner. The magnet armature 19 and the tappet 20 are therefore bathed with pressure fluid.

A closing member 37 in the form of a segment of a ball cooperates with the valve seat 28. The closing member 37 is embodied on the end face in a diametrically reduced, cylindrical section 38 of the tappet 20 in the valve chamber 31. The cone angle a of the valve seat 28 and the radius R of the closing member 37 are matched to each other in such a way that the sealing diameter $D_2$ of the valve seat is at least 1.3 times the diameter $D_1$ of the influx bore 29. The diameter $D_3$ of the tappet section 38, on the other hand, corresponds, at least almost, to the diameter $D_2$ of the valve seat 28, i.e. the tappet section 38 is slightly larger than the sealing diameter. The transition of the closing member 37 to the tappet section 38 is embodied as sharp-edged. In addition, FIG. 2 shows that the outlet of the valve seat 28 is disposed approximately in the region of the diameter $D_3$ of the tappet section 38.

The valve seat 28 of the valve body 23 and the closing member 37 of the tappet 20 constitute a seat valve 41, which assumes its open position when the magnet coil 16 is without current, through the action of the restoring spring 22. When supplied with current, the valve 10 can be switched into the closed position of the seat valve 41. Consequently, the electromagnetically actuated valve 10 is, in principle, an on-off valve in the form of a 2/2-way valve. It can be used in hydraulic brake systems of motor vehicles, as has been disclosed in the reference DE 44 12 648 A1 mentioned at the beginning and as has been described extensively in the reference DE 41 19 662 A1 as regards its circuit diagram and function. In an application of this kind, the pressure fluid inlet 24 of the valve 10 is connected to a master cylinder as a pressure source of the brake system and the pressure fluid outlet 33 is connected to a wheel brake as a pressure consumer.

Conventional on-off valves differ from the valve according to the invention in particular from its embodiment of the seat valve 41, in the following manner: in the conventional valve, the influx bore 29 has a diameter $D_1$, which almost corresponds to the sealing diameter $D_2$. Since the latter determines the level of magnetic force required to close the valve, in the conventional seat valve, the endeavor is made to attain a maximal through flow with a given magnetic force as a result of this matching of diameters. In addition, with the conventional seat valve, the cone angle α is selected as greater than 90° in order to be able to use larger diameter balls as the closing member 37 because these are easier to handle in their installation on the tappet 20. Moreover, with the conventional seat valve, the attempt is made to embody the transition between the ball face of the closing member 37 and the tappet 20 as edge-free. Finally, with the usual embodiment of the magnetic circuit in the conventional valve, the magnetic force has a progressive course in the transition into the closed position.

In contrast, the valve 10 according to the invention differs in the following manner:

In the closed position (FIG. 2) of the seat valve 41, the influx side pressure $p_1$ acts on an effective area of the tappet section 38 that is circumscribed by the sealing diameter $D_2$ and exerts an opening force on the tappet 20. The downstream side pressure $p_2$ prevailing in the valve chamber 31 and in the valve dome 14 is lower than the pressure $p_1$ and acts on the tappet 20 with a force in the closing direction. The hydraulic force $F_p$ resulting from these two forces consequently acts on the tappet 20 in the opening direction 20. The restoring spring 22, which is embodied as a screw compression spring, also acts on the tappet 20 with a force $F_F$ in the opening direction.

When the seat valve 41 opens, the lower pressure level $p_2$ penetrates in the direction toward the influx bore 29. Assuming a constant pressure difference between $p_1$ and $p_2$, the resulting hydraulic force $F_p$ decreases, monotonously falling over the increasing valve opening stroke H. The usually straight characteristic curve of the restoring spring 22 likewise decreases over the stroke H. In the closing procedure of the seat valve 41, the circumstances correspondingly reverse.

The progression of the forces $F_p$ and $F_F$, which are concatenated additively to each other, over the valve opening stroke H is indicated in a diagram in FIG. 3, in which the abscissa is associated with the stroke H and the ordinate is associated with the force F. The characteristic curve of this composite force $F_p$ and $F_n$ has a progression that decreases in a relatively rapid manner. Since this is essentially a function of the change of the hydraulic force $F_p$ over the valve opening stroke H and depends less on the characteristics of the restoring spring 22, the valve 10 can be equipped with a spring that has less spring rigidity, whose prestressing can be set in a relatively uncritical manner to a magnitude that is sufficient to transfer the magnet armature 19 and the tappet 20 from the closed position of the seat valve 41 into the open position.

The shaping of the seat valve 41 assures that the characteristic curve course $F_p+F_F$ reproduced in the diagram is to a large extent free of interfering influences. In this manner, a slight deflection of the pressure fluid flows in the seat valve 41 is achieved by means of the relatively small cone angle α of the valve seat 28. As a result, slight impulse forces are produced, which particularly occur with large through flows. The dependence of the valve properties on differential pressure and temperature of the pressure fluid is therefore low. Furthermore, the sharp-edged transition between the closing member 37 and the tappet section 38 assures that the pressure fluid flow always breaks away there and consequently leads to uniform flow forces on the closing member 37. The sharp-edged outlet of the valve seat 28 on the end face 30 of the valve body 23 also contributes to a stable flow of pressure fluid. This action of the pressure fluid flow on the turns of the restoring spring 22 disposed in the valve chamber 31 is therefore to a large extent free of interfering influences.

The hydraulic force $F_p$ and the spring force $F_F$ mentioned are counteracted by the magnetic force $F_M$ that is produced by excitation of the magnet coil 16 and acts in the closing direction of the seat valve 41. As its characteristic curve in the diagram according to FIG. 3 shows, measures familiar to one skilled in the art achieve the fact that with a particular excitation current I=constant, the magnetic force $F_M$ likewise assumes a monotonously falling course over the valve opening stroke H, but has a quantitatively lesser negative slope than that of the force progression $F_p+F_F$. The flat inclination of the characteristic curve $F_M$ can be achieved, for example, by means of corresponding embodiment of the magnetic circuit, particularly if, in the closed position of the valve 10, a relatively large residual air gap remains between the magnet armature 19 and the pole core 13, or if the magnet armature 19 and the pole core 13 are embodied as an immersion step. The magnetic force characteristic curve depicted is representative for a particular excitation current I=constant. As a result of disparate excitation currents, characteristic curves can be produced that are displaced in the direction of the ordinate. Altered excitation currents can be adjusted by means of current control, pulse width modulation, and other known processes.

In the diagram, the two characteristic curves $F_p+F_F$ as well as $F_M$ intersect at a point in which equilibrium prevails between the opening hydraulic force $F_p$ as well as the spring force $F_F$ on the one hand and the closing magnetic force $F_M$ on the other. This point is called the work point AP, in which the seat valve 41 assumes a stable position at stroke h. A magnetic force characteristic curve displaced in the direction of the double arrow in the diagram due to current control positions the work point at a different valve opening stroke. Consequently, despite the fact that it is structured as an on-off valve, the valve 10 according to the invention can be smoothly controlled in a current dependent manner with variable opening stroke, in a manner similar to a proportional valve. This control capacity exists at least when there are small valve opening strokes.

Particularly advantageous conditions with regard to the control and the structural expenditure for the electromagnetic part of the valve 10 are produced if the valve seat 28 has a cone angle α of 90° and smaller, and the sealing diameter $D_2$ of the valve seat 28 is at least 1.5 times the diameter $D_1$ of the influx bore 29.

The valve 10 according to the invention can be used in hydraulic brake systems of motor vehicles, for example for brake slip or drive slip regulation, or in brake systems with a hydraulic servo pressure source for direct control of brake pressure in wheel brake cylinders. With the valve 10, a smooth pressure and volume flow control is advantageously possible if the brake system is equipped with corresponding sensors and regulating electronics. The valve 10 can also be used as a pressure limiting valve by virtue of the fact that by means of current control, the reaction pressure is adjusted to either a constant value or values that change depending on the intended use.

The foregoing relates to preferred exemplary embodiments of the invention, it being understood that other variants and embodiments thereof are possible within the spirit and scope of the invention, the latter being defined by the appended claims.

We claim:

1. An electromagnetically actuated valve (10), for hydraulic brake systems of motor vehicles, comprising:

a seat valve (41) is provided between a pressure fluid inlet (24) and a pressure fluid outlet (33), the seat valve (41) has a hollow cone-shaped valve seat (28) and a closing member (37) in the shape of a segment of a ball, the valve seat (28) is centrally fed by an influx bore (29) that communicates with the pressure fluid inlet (24), the valve member (37) is embodied with a sharp-edged transition at an end face of a cylindrical section (38) of a tappet (20), the tappet (20) is engaged by a magnet armature (19) that acts on the tappet in a closing direction and by a restoring spring (22) that acts on the tappet in the opening direction, a sealing diameter ($D_2$) of the valve seat (28) has at least 1.3 times a diameter ($D_1$) of the influx bore (29), a cone angle ($\alpha$) of the valve seat (28) is at most 110°, a magnetic force ($F_M$) exerted on the magnet armature (19) and transmitted to the closing member (37) can be changed smoothly, wherein its course monotonously decreases with an increasing valve opening stroke (H), a force ($F_P+F_F$) on the closing member (37), produced by the pressure fluid and the restoring spring, has a course that monotonously decreases with the increasing valve opening stroke (H), whose inclination is quantitatively greater than that of the magnetic force progression.

2. The valve according to claim 1, in which the valve seat (28) freely ends in a sharp-edged fashion in the region of the diameter ($D_3$) of the tappet section (38).

3. The valve according to claim 2, in which the diameter ($D_3$) of the tappet section (38) corresponds at least approximately to the sealing diameter ($D_2$) of the valve seat (28).

* * * * *